United States Patent [19]
Kitahara et al.

[11] Patent Number: 4,910,001
[45] Date of Patent: Mar. 20, 1990

[54] METHOD FOR CLEANING GAS CONTAINING TOXIC COMPONENT

[75] Inventors: Koichi Kitahara; Noboru Akita; Takashi Shimada; Kohhei Sasaki; Tadashi Hiramoto, all of Kanagawa, Japan

[73] Assignee: Japan Pionics, Ltd., Tokyo, Japan

[21] Appl. No.: 238,068

[22] Filed: Aug. 30, 1988

[30] Foreign Application Priority Data

| Aug. 31, 1987 | [JP] | Japan | 62-215000 |
| Dec. 24, 1987 | [JP] | Japan | 32-325565 |
| Dec. 24, 1987 | [JP] | Japan | 62-325566 |
| May 19, 1988 | [JP] | Japan | 63-120645 |
| Jun. 14, 1988 | [JP] | Japan | 63-144643 |

[51] Int. Cl.$^4$ .................................. B01D 53/34
[52] U.S. Cl. .................................................. 423/210
[58] Field of Search ........................... 423/210, 248

[56] References Cited

U.S. PATENT DOCUMENTS

| 4,535,072 | 8/1985 | Kitayama et al. | 502/411 |
| 4,578,256 | 5/1986 | Nishino et al. | 423/248 |

FOREIGN PATENT DOCUMENTS

| 1131512 | 6/1962 | Fed. Rep. of Germany . | |
| 151788 | 12/1975 | Japan | 423/210 |
| 90726 | 5/1986 | Japan | 423/210 |
| 118117 | 6/1986 | Japan | 423/210 |
| 95119 | 5/1987 | Japan | 423/210 |
| 7105215 | 10/1971 | Netherlands . | |
| 328592 | 4/1930 | United Kingdom | 423/210 |

OTHER PUBLICATIONS

Patent Abstracts of Japan, vol. 9, No. 200, (C-298), (1923), Aug. 16th, 1985.
European Search Report.

*Primary Examiner*—Jeffrey E. Russel
*Attorney, Agent, or Firm*—Sughrue, Mion, Zinn, Macpeak & Seas

[57] ABSTRACT

A method for cleaning a gas containing at least one toxic component selected from the group consisting of arsine, phosphine, monosilane, diborane, and hydrogen selenide, which comprises contacting the gas with a cleaning agent containing a molded composition comprising (1) manganese dioxide and (2) cupric oxide, having deposited thereon (3) a silver compound, wherein the weight ratio of cupric oxide to manganese dioxide ranges from 0.2 to 1.2 and the amount of the deposited silver compound ranges from 0.01 to 10.5% by weight based on the cleaning agent. By the cleaning method, the toxic component can be removed from a gas, e.g., air, at high efficiency and at a high rate even in case of sudden leakage of the toxic component out of a bomb.

22 Claims, 1 Drawing Sheet

FIG.1

METHOD FOR CLEANING GAS CONTAINING TOXIC COMPONENT

FIELD OF THE INVENTION

This invention relates to a method for cleaning a gas and, more particularly, it relates to a method for efficiently cleaning a gas in case of sudden leakage of high concentration toxic components in the gas.

BACKGROUND OF THE INVENTION

With recent developments of semi-conductor industry, use of highly toxic hydride gases such as arsine, phosphine, monosilane, diborane, etc. has markedly increased.

These toxic components are essentially required as raw materials or doping gases in the production of silicon semi-conductors or compound semi-conductors. From considerations for environmental hygiene, maximum permissible concentrations of arsine ($AsH_3$), phosphine ($PH_3$), monosilane ($SiH_4$), diborane ($B_2H_6$), and hydrogen selenide ($SeH_2$) are 0.05 ppm, 0.3 ppm, 5 ppm, 0.1 ppm, and 0.05 ppm, respectively. These toxic gases are usually sold in bombs of about 0.1 to 50 l volume. Examples of commercially available bombs of these gases are shown below.

| Gas | Bomb Volume (l) | Concentration (%) | Base Gas | Packing Pressure (Kg/cm2G) | |
|---|---|---|---|---|---|
| $AsH_3$ | 47 | 10 | hydrogen | 75 | |
| $PH_3$ | 10 | 10 | hydrogen | 30 | |
| $SiH_4$ | 10 | 100 | none | 200 g | (weight of packed gas) |
| $B_2H_6$ | 47 | 3 | argon | 20 | |
| $SeH_2$ | 10 | 10 | hydrogen | 75 | |

For the purpose of preventing air pollution with the toxic gas leaked out of the bomb, these bombs connected to a pipe for feeding the gas to a semi-conductor process, etc. are usually placed in a container called bomb box to which a ventilation duct is connected. Nevertheless, there is no denying a danger of unexpected leaking of a gas so sudden and rapid that a bomb is exhausted in a short time like 5 to 10 minutes to contaminate the surrounding air. It has been, therefore, keenly demanded to take measures to insure the safety from such an accident.

Known methods for removing arsine, phosphine, etc. from a gas are divided into a wet process which comprises absorbing and decomposing the toxic component in a scrubber and a dry process which comprises passing a gas through a column packed with a cleaning agent such as adsorbents or oxidizing agents.

The conventional wet process generally has problems such as corrosion of the apparatus due to the use of an absorbing liquid and difficulty of post-treatment of the absorbing liquid, and thus the wet process entails cost for maintenance of the apparatus.

Known dry processes include use of a gas mask filled with activated carbon for removal of arsine, phosphine, etc. contained in air as is used as chemical weapons. By taking advantage of adsorbability of activated carbon, various attempts have been made to obtain improved removal performance by incorporating various substances into activated carbon by absorption. Examples of these cleaning agents include an adsorbing agent for removing arsine or phosphine which comprises activated carbon as a carrier having incorporated therein a copper compound, an alkali metal compound, and at least one of compounds of Al, Ti, V, Cr, Mn, Fe, etc. as disclosed in U.S. Pat. No. 4,532,115; and an adsorbing agent comprising activated carbon having impregnated therein iodine or an iodine compound and a metal sulfate, etc. as disclosed in JP-A-60-71040 (the term "JP-A" as used herein means an "unexamined published Japanese patent application").

Apart from these cleaning agents using activated carbon as a carrier, the present inventors previously proposed a molded cleaning agent comprising (1) cupric oxide and (2) at least one metal oxide selected from the group consisting of silicon oxide, aluminum oxide and zinc oxide as disclosed in U.S. Pat. No. 4,743,435 (EPC 0194366).

Although the above-described adsorbing agents comprising activated carbon as a carrier are capable of removing toxic components, e.g., arsine, phosphine, etc., in relatively low concentrations, their activity is too low to remove high concentration toxic components contained in a gas flowing at a high rate. Besides, there is a fear that iodine resulting from reduction with the hydride gas is scattered in the gas treated.

On the other hand, the molded cleaning agent according to U.S. Pat. No. 4,743,435 exhibits greatly increased capacity of removing toxic components per unit weight and volume as compared with the conventional cleaning agents and is, therefore, capable of removing a large amount of toxic components. This cleaning agent is, however, still insufficient in rate of cleaning depending on conditions of use. Therefore, it cannot sufficiently and rapidly cope with such a case of emergency as sudden leakage of toxic gas from a bomb.

As the case stands, it has been demanded in the art to develop a cleaning method exhibiting further improved removing capacity enough to meet sudden emergency such as leakage of a large quantity of a toxic gas.

SUMMARY OF THE INVENTION

One object of this invention is to provide a method of efficiently removing high concentration toxic gas having leaked in air, etc.

In order to solve the problem associated with the above-described molded cleaning agent composed of cupric oxide and at least one metal oxide selected from silicon oxide, aluminum oxide and zinc oxide, the inventors have conducted further investigations. As a result, it has now been found that the above object can be accomplished by a molded cleaning agent having a composition comprising (1) manganese dioxide and (2) cupric oxide, having deposited thereon a silver compound.

This invention relates to a method for cleaning a gas containing at least one toxic component selected from the group consisting of arsine, phosphine, monosilane, diborane, and hydrogen selenide, which comprises contacting the gas with a cleaning agent containing a molded composition comprising (1) manganese dioxide and (2) cupric oxide, having deposited thereon a silver compound, wherein the weight ratio of cupric oxide to manganese dioxide ranges from 0.2 to 1.2 and the amount of the deposited silver compound ranges from 0.01 to 10.0% by weight based on the weight of the cleaning agent.

The cleaning method of the present invention is applicable to removal of toxic components, e.g., arsine, phosphine, etc., contained in air, nitrogen, hydrogen, etc.

The cleaning method of the present invention is particularly effective for removing large quantities of the toxic components present in relatively high concentrations at a high rate of cleaning at ambient temperature. For example, they manifest excellent effects in rapid cleaning of gases (usually air) contaminated with toxic components due to sudden leakage of the toxic component out of a bomb.

DETAILED DESCRIPTION OF THE INVENTION

The cleaning agent which can be used in the present invention contains a molded composition comprising manganese dioxide and cupric oxide (hereinafter referred to as Mn-Cu composition) having deposited thereon a silver compound.

The effective components in the Mn-Cu composition, manganese dioxide and cupric oxide, are present in a total amount of at least 60% by weight, preferably at least 70% by weight, based on the composition. The weight ratio of cupric oxide to manganese dioxide ranges from 0.2 to 1.2, preferably from 0.3 to 0.8.

If the cupric oxide/manganse dioxide weight ratio is less than 0.2, the cleaning capacity is reduced. If it exceeds 1.2, the rate of cleaning is reduced.

In a preferred embodiment of the present invention, the Mn-Cu composition further comprises cobalt oxide as a third component. Of cobalt oxides including CoO, $CoO_3$, $Co_3O_4$, etc., $Co_2O_3$ [cobalt (III) oxide] is chiefly used in the present invention.

The content of cobalt oxide in the Mn-Cu composition usually ranges from 5 to 40% by weight, preferably from 10 to 30% by weight, though varying depending on the contents of manganese dioxide and cupric oxide.

In addition to these effective components, i.e., manganese dioxide, cupric oxide and cobalt oxide, the Mn-Cu composition may further comprise other components, such as oxides of aluminum, silicon, zinc, iron, nickel and potassium, etc. The total content of these optional components varies depending on the contents of the above-described effective components and is usually not more than 40% by weight, preferably not more than 30% by weight, based on the composition.

The Mn-Cu composition can be obtained by various processes, including a process comprising mixing all the oxide components at the same time, a process comprising mixing manganese dioxide and cupric oxide and blending the mixture with cobalt oxide (commercially available products "Hopacalite" which are mixtures of manganese dioxide and cupric chloride in various compositions may be utilized), and a process comprising mixing the components in the form of their intermediates, such as salts or hydroxides, and converting them to their oxides by calcination or the like technique.

The Mn-Cu composition is used as extrusion-molded articles (pellets) having a size of from about 1.5 to 4 mm (diameter)×3 to 20 mm, tablet-pressed articles (usually cylinderial form) having a size of from about 3 to 6 mm (diameter)×3 to 6 mm, or in any other shape obtained by crushing the molded articles to a size of from about 4 to 20 mesh. The size of the molded composition is subject to variation according to designing conditions of apparatus.

The molded Mn-Cu composition may be used as such as a cleaning agent for removing hydride gases, such as arsine and phosphine, to some extent as long as used in dry gases. However, scarcely is manifested cleaning ability in a gas containing moisture, such as air having a relative humidity of from 30 to 100%.

According to the present invention, in order to eliminate this disadvantage and, at the same time, to further improve the cleaning ability of the Mn-Cu molded composition, a silver compound is deposited on the molded Mn-Cu composition.

The silver compound which can be used in the present invention includes silver (I) oxide, silver (II) oxide, and silver (I) salts, e.g., inorganic acid salts, organic acid salts and halogen salts. The inorganic acid silver salts include silver carbonate, silver nitrate, silver nitrite, silver sulfate, silver sulfite, silver chlorate, silver perchlorate, silver bromate, silver iodate, silver periodate, disilver hydrogenphosphate, silver phosphate, silver pyrophosphate, silver metaphosphate, silver tetrafluoroborate, and silver hexafluorophosphate. Organic acid silver salts include silver acetate and silver oxalate. The silver halides include silver fluoride, silver chloride, silver bromide, and silver iodide. Among them, silver (I) oxide and silver (II) oxide are preferred. Of the various silver (I) salts, generally preferred are sparingly water soluble or water-insoluble salts, e.g., silver carbonate, silver nitrate, silver phosphate, silver sulfite, silver chloride, silver bromide, silver iodide, silver iodate, silver pyrophosphate, silver metaphosphate, and silver oxalate. More preferred of them is silver (II) oxide, silver (I) carbonate, silver (I) oxide, and mixtures thereof. The most preferred is silver (II) oxide.

The amount of the silver compound to be deposited on the molded Mn-Cu composition usually ranges from 0.01 to 10.0% by weight, preferably from 0.2 to 5% by weight, based on the weight of the cleaning agent. If it is less than 0.01 wt%, the cleaning efficiency would be reduced. An amount exceeding 10 wt% is poor economy.

Deposition of the silver compound onto the molded Mn-Cu composition can be carried out by various processes, either in a dry process or in a wet process. In a simple way, the deposition can be effected by scattering a powderous silver compound on the Mn-Cu molded composition, spraying an aqueous slurry of a silver compound onto the molded composition, or impregnating an aqueous solution of a water-soluble silver compound into the molded composition. For the purpose of ensuring adhesion of the silver compound to the molded composition, a small amount of manganese dioxide, cupric oxide and/or cobalt oxide may be incorporated into the silver compound to be deposited.

The individual particles of the cleaning agent used in the present invention have a density ranging from 0.62 to 1.88 g/ml, preferably from 0.78 to 1.56 g/ml. The term "density of particles" as used herein means a quotient obtained by dividing a weight of a molded composition (particle) by its geometrical volume. The packing density of the cleaning agent ranges from about 0.4 to 1.2 g/ml, preferably from about 0.5 to 1.0 g/ml. The term "packing density" as used herein means a quotient obtained by dividing a weight of a cleaning agent packed in a cleaning column by a volume of the column filled with the cleaning agent.

The upper limit of the concentration of the hydride gases, e.g., arsine and phosphine, which can be removed by the cleaning agent of this invention is usually 1% by volume. Treatment of gases having higher concentrations would be attended by great heat generation, requiring an extra means, such as a cooling apparatus.

The contact of the toxic gas to be treated and the cleaning agent is usually carried out at a temperature between about 0° and about 90° C., preferably at room temperature of from about 10° to about 50° C., without requiring a special means of heating or cooling. It is a matter of course that the temperature increases after the start of the contact in proportion to concentration of the hydride gas due to the heat of reaction.

The pressure during the contact is usually atmospheric. The contact may also be conducted under reduced pressure or under pressure, e.g., at 1 Kg/cm$^2$G. The contact time is usually 0.01 second or more, preferably 0.025 second or more. A contact time less than 0.01 second sometimes results in the failure of sufficient cleaning.

The moisture content in the gas to be treated according to the present invention, e.g., air, nitrogen and hydrogen, is not particularly limited, and either dry or wet gases can be applied to the present invention. In most cases, the gas is treated as having a relative humidity of from 30 to 100% which corresponds to the moisture content in the atmosphere. In these cases, the water content of the cleaning agent varies in proportion to relative humidity of the gas and is usually maintained in the range of from 5 to 30% by weight.

The cleaning agent according to the present invention is freed from adverse influences from carbonic dioxide or the like component present in the air, etc. In some cases, existence of these gases brings about rather improved performances of the cleaning agent.

It is preferable that the cleaning agent be subjected to moisture conditioning in advance of cleaning treatment by contact with a gas having approximately the same moisture content as the gas to be cleaned so as to have the moisture content in agreement with the humidity of the gas to be treated.

The cleaning agent is generally used as a fixed bed filled in a cleaning column. It may also be used as a moving bed or a fluidized bed. One of the embodiments of the present invention is shown in FIG. 1, wherein cleaning column 1 packed with the cleaning agent of the present invention is fixed to ventilating duct 5 between bomb box 3 containing bomb 2 and blower 4 which continuously ventilates the bomb box by suction.

Figure 1:
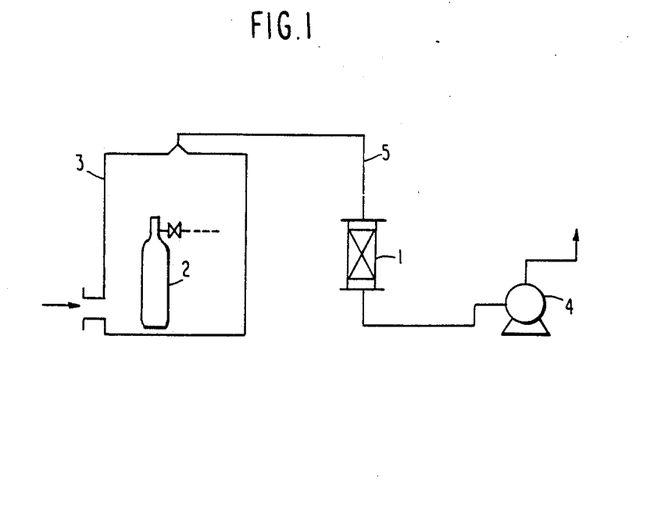
FIG. 1 illustrates a flow sheet of the cleaning method of the present invention, wherein a cleaning column packed with a cleaning agent is placed in the flow path of a gas.

When in using the cleaning agent in accordance with the embodiment of FIG. 1, should the concentration of the toxic component be very high as exceeding 1% by volume, a large quanity of heat is generated. Such being the case, a means for removing heat would be required. It is usual, however, that the blower has a sufficient capacity for diluting the toxic component to a concentration of 1% by volume or less through mixing with air even when sudden leakage of the toxic component takes place. More specifically, most of the apparatus as shown in FIG. 1 are equipped with a blower having a ventilation capacity of about 5 to 200 m$^3$/min. It is predictable, therefore, that the concentration of the toxic component in air, etc. would be within the range of from about 50 to 1000 ppm in the case when leakage of a toxic gas happens so seriously that a commercially available bomb may be exhausted in 5 to 10 minutes.

The length of the cleaning agent packed in a cleaning column (packing length) cannot be definitely specified as it varies depending on the flow velocity of the gas to be cleaned or the concentration of the toxic component. Usually, the cleaning agent is packed to a packing length of from about 50 to 500 mm, and the cleaning column has such an inner diameter that the superficial linear viscosity in the column becomes about 0.3 to 1.5 m/sec. In general, the inner diameter of the cleaning column is determined by the pressure loss of the packed layer, the efficiency of contact with gas, the quantity of toxic gas, and the like.

According to the cleaning method of the present invention, toxic components, e.g., arsine, phosphine, diborane, monosilane, and hydrogen selenide, contained in a large quantity and at relatively high concentration in a gas, such as air, can be removed at high efficiency and at a high rate. Therefore, the present invention provides an excellent method which can cope with such emergency that a toxic gas suddenly leaks out of a bomb.

The present invention will now be illustrated in greater detail by way of the following Examples and Comparative Examples, but it should be understood that the present invention is not deemed to be limited thereto. In these examples, all percents are by weight unless otherwise indicated.

EXAMPLES 1 TO 8

Preparation of Silver (II) Oxide

In 200 ml of water was dissolved 102 g of silver nitrate. Separately, 90 g of sodium hydroxide and 150 g of potassium persulfate were dissolved in 200 ml of ion-exchanged water while stirring. The former solution was added dropwise to the latter solution while being stirred under heat to form a percipitate. The precipitate was collected by repetition of decantation and washing with water and dried in vacuo at 100° C. for 3 hours to obtain 74 g of silver (II) oxide as a powder.

Mn-Cu Molded Composition

A commercially available extrusion-molded Mn-Cu composition "Hopcalite" was used. The molded composition had a diameter of 1.5 mm and a length of from 3 to 10 mm and comprised 50% of manganese dioxide ($MnO_2$), 22% of cupric oxide (CuO), 25% of aluminum oxide ($Al_2O_3$) and small amounts of a potassium compound, etc.

Preparation of Cleaning Agent

One killogram of the Mn-Cu molded composition was dried at 120° C. for 2 hours and spread over a tray. Separately, 40 g of silver (II) oxide was suspended in 500 ml of water, and the suspension was scattered over the molded composition while vigorously stirring. The molded composition thus having deposited thereon the silver (II) oxide powder was dried at 80° C. for 2 hours to obtain a cleaning agent having deposited thereon 3.85% of silver (II) oxide. The density of the particles was 1.08 g/ml. The cleaning agent was allowed to stand in air so as to absorb moisture in the atmosphere to have a water content of about 10%.

Determination of Cleaning Capacity

The above-prepared cleaning agent was packed in a quartz-made cleaning column having an inner diameter of 19 mm to a packing length of 100 mm which corresponded to an amount of 28.3 ml in volume and 19.5 g in weight.

Air having a relative humidity of 60% and a temperature of 25° C. containing 200 to 2000 ppm of arsine, phosphine, diborane, monosilane or hydrogen selenide as a toxic component was passed through the column at a rate of 11.4 to 20.4 l/min [superficial linear velocity in a column (hereinafter referred to as "LV")=67 to 120 cm/sec]. A part of the gas at the outlet of the column was sampled, and the time required for the concentration of arsine or phosphine in the gas at the outlet to increase up to 25 ppb (hereinafter referred to as "effective treatment time") was determined by atomic-absorption spectroscopy.

Diborane or hydrogen selenide in the sample was monitored by the use of the following detector tubes, and the time until it was detected (effective treatment time) was determined.

Diborane: Detector tube manufactured by Dräger A.G.; minimum detectable limit: 0.05 ppm Hydrogen Selenide: Detector tube manufactured by Komyo Rikagaku Co.; minimum detectable limit: 1 ppm Monosilane was detected by means of a color changing reagent comprising basic copper carbonate carried on alumina. The minimum detectable limit was 10 ppm. The results obtained are shown in Table 1.

TABLE 1

| Example No. | Toxic Component | Concn. of Toxic Component (ppm) | LV (cm/sec) | Effective Treatment Time (min) |
|---|---|---|---|---|
| 1 | arsine | 1000 | 67 | 43 |
| 2 | arsine | 2000 | 67 | 17 |
| 3 | arsine | 200 | 67 | 228 |
| 4 | arsine | 1000 | 120 | 17 |
| 5 | phosphine | 1000 | 67 | 22 |
| 6 | monosilane | 1000 | 67 | 15 |
| 7 | diborane | 1000 | 67 | 21 |
| 8 | hydrogen selenide | 1000 | 67 | 55 |

COMPARATIVE EXAMPLES 1 AND 2

Hopcalite of the same kind as used in Example 1 was dried and allowed to stand in air so as to have a water content of about 10%. The thus conditioned molded composition was used as a cleaning agent and evaluated for cleaning capacity in the same manner as in Example 1 or 5. The results obtained are shown in Table 2.

TABLE 2

| Comparative Example No. | Toxic Component | Concn. of Toxic Component (ppm) | LV (cm/sec) | Effective Treatment Time (min) |
|---|---|---|---|---|
| 1 | arsine | 1000 | 67 | 0.5 |
| 2 | phosphine | 1000 | 67 | 0.5 |

EXAMPLES 9 AND 10

The cleaning agent of Example 1 was evauated in the same manner as in Example 1, except for using nitrogen containing 1,000 ppm of arsine or hydrogen containing 1,000 ppm of phosphine was treated with the cleaning agent. The results obtained are shown in Table 3.

TABLE 3

| Example No. | Base Gas | Toxic Component Kind | Concn. (ppm) | LV (cm/sec) | Effective Treatment Time (min) |
|---|---|---|---|---|---|
| 9 | nitrogen | arsine | 1000 | 67 | 15 |
| 10 | hydrogen | phosphine | 1000 | 67 | 16 |

EXAMPLES 11 AND 12

Preparation of Silver (II) Oxide Containing $MnO_2$

The preparation of silver (II) oxide of Example 1 was repeated except that 2.27 g of manganese nitrate was added to the solution of 102 g of silver nitrate in 200 ml of water to obtain a powder of silver (II) oxide containing about 0.5% of manganese dioxide.

Preparation of Cleaning Agent

The resulting powder was scattered over Hopcalite of the same kind as used in Example 1 in a dry process. The mixture was stirred well to prepare a cleaning agent having deposited thereon about 3.85% of silver (II) oxide and a small amount of manganese dioxide.

The resulting cleaning agent was evaluated in the same manner as in Example 1 or 5. The results obtained are shown in Table 4.

TABLE 4

| Example No. | Toxic Component | Concn. of Toxic Component (ppm) | LV (cm/sec) | Effective Treatment Time (min) |
|---|---|---|---|---|
| 11 | arsine | 1000 | 67 | 45 |
| 12 | phosphine | 1000 | 67 | 23 |

EXAMPLES 13 AND 14

Molded Mn-Cu Composition

Hopcalite having a different composition from that used in Example 1 was used. The composition comprised 58% of manganese dioxide ($MnO_2$), 38% of cupric oxide (CuO) and small amounts of a potassium compound, etc. The composition was in the form of crushed particles having a size of from 8 to 14 mesh (Example 13) or pellets having a diameter of 4.8 mm and a length of 4.8 mm (Example 14). The pellets were used as divided into quarters.

Preparation of Cleaning Agent

A cleaning agent having deposited thereon 3.85% of silver (II) oxide was prepared according to the same wet process as in Example 1, except for using the above-described molded Mn-Cu composition.

Determination of Cleaning Capacity

Each of the cleaning agents was evaluatd in the same manner as in Example 1. The results obtained are shown in Table 5.

TABLE 5

| Example No. | Toxic Component | Concn. of Toxic Component (ppm) | LV (cm/sec) | Effective Treatment Time (min) |
|---|---|---|---|---|
| 13 | arsine | 1000 | 67 | 35 |

TABLE 5-continued

| Example No. | Toxic Component | Concn. of Toxic Component (ppm) | LV (cm/sec) | Effective Treatment Time (min) |
| --- | --- | --- | --- | --- |
| 14 | arsine | 1000 | 67 | 18 |

COMPARATIVE EXAMPLES 3 TO 5

A cleaning agent was prepared in the same manner as in Example 1, except for replacing the Mn-Cu molded composition with activated carbon (Comparative Example 3), α-alumina (Comparative Example 4) or Molecular Sieve 5A (Comparative Example 5) each having a particle size of from 6 to 10 mesh and changing the deposited amount of silver (II) oxide to 4.25%.

Each of the resulting cleaning agent was evaluated in the same manner as in Example 1. The results obtained are shown in Table 6.

TABLE 6

| Comparative Example No. | Toxic Component Kind | Concn. (ppm) | LV cm/sec | Carrier | Effective Treatment Time (min) |
| --- | --- | --- | --- | --- | --- |
| 3 | arsine | 1000 | 67 | activated carbon | 0 |
| 4 | arsine | 1000 | 67 | α-alumina | 0 |
| 5 | arsine | 1000 | 67 | Molecular Sieve 5A | 0 |

EXAMPLE 15 AND 16

A cleaning agent was prepared in the same manner as in Example 1, except for changing the deposited amount of silver (II) oxide to 0.5% or 2.0%. Each of the resulting cleaning agents was evaluated in the same manner as in Example 1, and the results obtained are shown in Table 7.

TABLE 7

| Example No. | Toxic Component Kind | Concn. (ppm) | LV (cm/sec) | AgO Deposite (wt %) | Effective Treatment Time (min) |
| --- | --- | --- | --- | --- | --- |
| 15 | arsine | 1000 | 67 | 2.0 | 30 |
| 16 | arsine | 1000 | 67 | 0.5 | 20 |

EXAMPLE 17

In order to examine influences of carbon dioxide in air, etc. upon cleaning capacity, the cleaning agent as prepared in Example 1 was exposed to flowing air containing 1% by volume of carbon dioxide for 8 hours, which resulted in endothermic reaction.

The thus treated cleaning agent was evaluated in the same manner as in Example 1. The result obtained are shown in Table 8.

TABLE 8

| Example No. | Deposited Compound | Toxic Component Kind | Concn. (ppm) | LV (cm/sec) | Effective Treatment Time (min) |
| --- | --- | --- | --- | --- | --- |
| 17 | AgO(+CO2) | arsine | 1000 | 67 | 55 |

EXAMPLES 18 TO 25

Preparation of Mn-Cu Molded Composition Containing $Co_2O_3$

Activated manganese dioxide (100 g), copper (II) hydroxide [40 g on conversion to copper (II) oxide], and cobalt hydroxide [40 g on conversion to cobalt oxide ($Co_2O_3$)] were weighed and mixed in a powderous state. To the powderous mixture were added 15 g of alumina sol ($Al_2O_3$) and a small amount of water, followed by kneading. The blend was extruded and calcined at 300° C. for 3 hours to obtain a molded Mn-Cu composition containing cobalt oxide having a diameter of 1.5 mm and a length of 20 mm.

Preparation of Cleaning Agent

A suspension of 7.2 g of silver (II) oxide in 100 ml of water was scattered while being vigorously stirring over the Mn-Cu molded composition containing cobalt oxide in a tray, and the particles were dried at 80° C. for 2 hours to obtain a cleaning agent having deposited thereon 3.85% of silver (II) oxide (particle density: 1.08 g/ml). The cleaning agent was allowed to stand in air so as to have a water content of about 10%.

Determination of Cleaning Capacity

The resulting cleaning agent was evaluated in the same manner as in Examples 1 to 8. The results obtained are shown in Table 9.

TABLE 9

| Example No. | Toxic Component Kind | Concn. (ppm) | LV (cm/sec) | Effective Treatment Time (min) |
| --- | --- | --- | --- | --- |
| 18 | arsine | 1000 | 67 | 400 |
| 19 | arsine | 2000 | 67 | 183 |
| 20 | arsine | 200 | 67 | 2000 |
| 21 | arsine | 1000 | 120 | 360 |
| 22 | phosphine | 1000 | 67 | 120 |
| 23 | monosilane | 1000 | 67 | 74 |
| 24 | diborane | 1000 | 67 | 110 |
| 25 | hydrogen selenide | 1000 | 67 | 200 |

EXAMPLES 25 AND 27

The same procedure of Example 1 was repeated, except that the cleaning agent containing cobalt oxide as prepared in Example 18 was used as a cleaning agent and that nitrogen containing 1000 ppm of arsine (Example 26) or hydrogen containing 1000 ppm of phosphine was treated. The results of evaluations are shown in Table 10.

TABLE 10

| Example No. | Base Gas | Toxic Component Kind | Concn. (ppm) | LV (cm/sec) | Effective Treatment Time (min) |
| --- | --- | --- | --- | --- | --- |
| 26 | nitrogen | arsine | 1000 | 67 | 75 |
| 27 | hydrogen | phosphine | 1000 | 67 | 42 |

EXAMPLES 28 AND 29

The same procedure of Example 18 was repeated, except for changing the deposited amount of silver (II) oxide to 0.5% or 2.0%. The results of evaluations are shown in Table 11.

TABLE 11

| Example No. | Toxic Component Kind | Concn. (ppm) | LV (cm/sec) | AgO Deposite (wt %) | Effective Treatment Time (min) |
| --- | --- | --- | --- | --- | --- |
| 28 | arsine | 1000 | 67 | 2.0 | 150 |
| 29 | " | 1000 | 67 | 0.5 | 70 |

COMPARATIVE EXAMPLES 6 AND 7

The Mn-Cu molded composition containing cobalt oxide as prepared in Example 18 was dried and allowed to stand in a room so as to have a water content of about 10%. The resulting cleaning agent (no deposition of silver (II) oxide) was evaluated in the same manner as in Example 1 or 5. The results obtained are shown in Table 12.

TABLE 12

| Comparative Example No. | Toxic Component | Concn. of Toxic Component (ppm) | LV (cm/sec) | Effective Treatment Time (min) |
| --- | --- | --- | --- | --- |
| 6 | arsine | 1000 | 67 | 0.5 |
| 7 | phosphine | 1000 | 67 | 0.5 |

EXAMPLES 30 TO 32

A cobalt oxide-containing Mn-Cu molded composition was prepared in the same manner as in Example 18, except for changing the amount of cobalt (III) hydroxide to 20 g, 30 g or 50 g (on conversion to $Co_2O_3$).

A suspension of silver (II) oxide was spread over each of the molded compositions to obtain a cleaning agent having deposited thereon 3.85% of silver (II) oxide. After the cleaning agent was allowed to stand in a room so as to have a water content of about 10%, the cleaning capacity was evaluated in the same manner as in Example 1. The results obtained are shown in Table 13.

TABLE 13

| Example No. | Concn. of Arsine (ppm) | Amount of Cobalt Oxide (g) | LV (cm/sec) | Effective Treatment Time (min) |
| --- | --- | --- | --- | --- |
| 30 | 1000 | 20 | 67 | 282 |
| 31 | 1000 | 30 | 67 | 323 |
| 32 | 1000 | 50 | 67 | 380 |

EXAMPLES 33 TO 40

Preparation of Silver (I) Oxide

In 200 ml of water was dissolved 102 g of silver nitrate. Separately, 90 g of sodium hydroxide was dissolved in 200 ml of ion-exchanged water warmed at 85° C. while stirring. To the latter solution while being stirred was added dropwise the former solution to form a precipitate, which was collected by repetition of decantation and washing with water. The precipitate was dried in vacuo at 100° C. for 3 hours to obtain 69 g of siler (I) oxide.

Mn-Cu Molded Composition

Hopcalite of the same kind as used in Example 1 was used.

Preparation of Cleaning Agent

One killogram of the hopcalite molded particles was dried at 120° C. for 2 hours and placed in a tray. A suspension of 40 g of silver (I) oxide in 500 ml of water was scattered over the particles while vigorously stirring, followed by drying to obtain a cleaning agent having deposited thereon 3.85% of silver (I) oxide. The cleaning agent was allowed to stand in a room so as to have a water content up to about 10%.

Determination of Cleaning Capacity

The cleaning agent thus conditioned was evaluated in the same manner as in Examples 1 to 8. The results obtained are shown in Table 14 below.

TABLE 14

| Example No. | Toxic Component Kind | Concn. (ppm) | LV (cm/sec) | Effective Treatment Time (min) |
| --- | --- | --- | --- | --- |
| 33 | arsine | 1000 | 67 | 28 |
| 34 | " | 2000 | 67 | 15 |
| 35 | " | 200 | 67 | 140 |
| 36 | " | 1000 | 120 | 10 |
| 37 | phosphine | 1000 | 67 | 12 |
| 38 | monosilane | 1000 | 67 | 8 |
| 39 | diborane | 1000 | 67 | 13 |
| 40 | hydrogen selenide | 1000 | 67 | 32 |

EXAMPLES 41 AND 42

Mn-Cu Molded Composition

Hopcalite of the same kind as used in Examples 13 and 14 was used.

Preparation of Cleaning Agent

In the same manner as in Example 33, a cleaning agent having deposited thereon 3.85% of silver (I) oxide was prepared.

Determination of Cleaning Capacity

The cleaning agent was evaluated in the same manner as in Example 1. The results obtained are shown in Table 15.

TABLE 15

| Example No. | Toxic Component Kind | Concn. (ppm) | LV (cm/sec) | Effective Treatment Time (min) | Shape of Hopcalite |
| --- | --- | --- | --- | --- | --- |
| 27 | arsine | 1000 | 67 | 27 | crushed particles (8 to 14 mesh) |
| 28 | " | 1000 | 67 | 14 | quaters of pellets [4.8 mm (d) × 4.8 mm] |

COMPARATIVE EXAMPLES 8 TO 10

Silver (I) oxide was deposited on activated carbon, α-alumina or Molecular Sieve 5A each having a particle size of from 6 to 10 mesh to prepare a cleaning agent having deposited thereon 4% of silver (I) oxide. Each of the resulting cleaning agents was evaluated in the same manner as in Example 1. The results obtained are shown in Table 16 below.

TABLE 16

| Comparative Example No. | Toxic Component Kind | Concn. (ppm) | LV (cm/sec) | Carrier | Effective Treatment Time (min) |
|---|---|---|---|---|---|
| 8 | arsine | 1000 | 67 | activated carbon | 0 |
| 9 | " | 1000 | 67 | α-alumina | 0 |
| 10 | " | 1000 | 67 | Molecular Sieve 5A | 0 |

EXAMPLES 43 AND 44

Silver (I) oxide was deposited on molded Hopcalite of the same kind as used in Example 1 to prepare a cleaning agent having deposited thereon 0.5% or 2.0% of silver (I) oxide. Each of the resulting cleaning agents was evaluated in the same manner as in Example 1. The results are shown in Table 17.

TABLE 17

| Example No. | Toxic Component Kind | Concn. (ppm) | LV (cm/sec) | Amount of Silver (I) Oxide (wt %) | Effective Treatment Time (min) |
|---|---|---|---|---|---|
| 43 | arsine | 1000 | 67 | 2.0 | 22 |
| 44 | " | 1000 | 67 | 0.5 | 11 |

EXAMPLES 45 TO 52

Mn-Cu Molded Composition Containing Cobalt Oxide

The same molded composition as used in Example 18 was used.

Preparation of Cleaning Agent

A suspension of 7.2 g of silver (I) oxide in 100 ml of water was scattered over the cobalt oxide-containing Mn-Cu molded composition in a tray while vigorously stirring. The particles were dried at 80° C. for 2 hours to obtain a cleaning agent having deposited thereon 3.85% of silver (I) oxide. The cleaning agent was then allowed to stand in a room so as to adsorb water up to a water content of about 10%.

Determination of Cleaning Capacity

The cleaning capacity of the cleaning agent was evaluated in the same manner as in Examples 1 to 8. The results obtained are shown in Table 18.

TABLE 18

| Example No. | Toxic Component Kind | Concn. (ppm) | LV (cm/sec) | Effective Treatment Time (min) |
|---|---|---|---|---|
| 45 | arsine | 1000 | 67 | 150 |
| 46 | " | 2000 | 67 | 70 |
| 47 | " | 200 | 67 | 220 |
| 48 | " | 1000 | 120 | 45 |
| 49 | phosphine | 1000 | 67 | 38 |
| 50 | monosilane | 1000 | 67 | 15 |
| 51 | diborane | 1000 | 67 | 28 |
| 52 | hydrogen selenide | 1000 | 67 | 40 |

EXAMPLES 53 TO 60

Mn-Cu Molded Composition

Hopcalite of the same kind as used in Example 1 was used.

Preparation of Cleaning Agent

Hopcalite (300 g) was dried at 120° C. for 2 hours and spread in a tray. A suspension of 12 g of silver (I) carbonate in 100 ml of water was scattered over the Hopcalite particles while vigorously stirring. The silver (I) carbonate particles remaining on the inner wall of the container was re-suspended in 100 ml of fresh water and again scattered on Hopcalite particles. The re-suspension and re-scattering was repeated once more thereby to deposite all the silver (I) carbonate charged. The Hopcalite particles were dried at 80° C. for 10 hours to obtain 312 g of a cleaning agent having deposited thereon 3.85% of silver (I) carbonate. The cleaning agent was allowed to stand in a room so as to have a water content of about 8%.

Determination of Cleaning Capacity

The resulting cleaning agent was evaluated in the same manner as in Examples 1 to 8. The results obtained are shown in Table 19.

TABLE 19

| Example No. | Toxic Component Kind | Concn. (ppm) | LV (cm/sec) | Effective Treatment Time (min) |
|---|---|---|---|---|
| 53 | arsine | 1000 | 67 | 39 |
| 54 | " | 2000 | 67 | 15 |
| 55 | " | 200 | 67 | 220 |
| 56 | " | 1000 | 120 | 15 |
| 57 | phosphine | 1000 | 67 | 16 |
| 58 | monosilane | 1000 | 67 | 10 |
| 59 | diborane | 1000 | 67 | 16 |
| 60 | hydrogen selenide | 1000 | 67 | 30 |

EXAMPLE 61

A suspension containing equal weights of silver (I) carbonate and silver (II) oxide was scattered over the same Hopcalite molded particles as used in Example 1 to obtain a cleaning agent having deposited thereon 3.85% of the silver compounds in total. The resulting cleaning agent was evaluated in the same manner as in Example 1. The result obtained is shown in Table 20.

TABLE 20

| Example No. | Toxic Component Kind | Concn. (ppm) | Amount of AgO + Ag$_2$CO$_3$ (wt %) | LV (cm/sec) | Effective Treatment Time (min) |
|---|---|---|---|---|---|
| 61 | arsine | 1000 | 3.85 | 67 | 38 |

EXAMPLES 62 AND 63

Preparation of Cleaning Agent

Hopcalite of the same kind as used in Example 1 (200 g) was dried at 120° C. for 2 hours. Forty-eight grams of a solution containing 20 g of silver nitrate dissolved in 100 ml of water was sprayed onto the dried Hopcalite particles, and the particles were dried at 80° C. for 10 hours to obtain 208 g of a cleaning agent having deposited thereon 3.85% of silver nitrate. The cleaning agent was allowed to stand in air so as to have a water content of about 8%. The thus conditioned cleaning agent was evaluated in the same manner as in Examples 1 and 5. The results obtained are shown in Table 21

TABLE 21

| Example No. | Toxic Component Kind | Concn. (ppm) | LV (cm/sec) | Effective Treatment Time (min) |
|---|---|---|---|---|
| 62 | arsine | 1000 | 67 | 12 |
| 63 | phosphine | 1000 | 67 | 7 |

EXAMPLE 64 AND 65

Mn-Cu Molded Composition

The same Hopcalite particles as used in Examples 13 or 14 were used.

Preparation of Cleaning Agent

Silver (I) carbonate was deposited on the Hopcalite particles to prepare a cleaning agent having deposited thereon 3.85% of silver (I) carbonate.

Determination of Cleaning Capacity

The cleaning agent was evaluated in the same manner as in Example 1. The results obtained are shown in Table 22.

TABLE 22

| Example No. | Toxic Component Kind | Concn. (ppm) | LV (cm/sec) | Effective Treatment Time (min) | Shape of Hopcalite |
|---|---|---|---|---|---|
| 64 | arsine | 1000 | 67 | 32 | crushed particles (8 to 14 mesh) |
| 65 | " | 1000 | 67 | 15 | quaters of pellets [4.8 mm (d) × 4.8 mm] |

COMPARATIVE EXAMPLES 11 TO 13

Silver (I) carbonate was deposited on activated carbon, α-alumina or Molecular Sieve 5A each having a particle size of 6 to 10 mesh to obtain a cleaning agent having deposited thereon 4.25% of silver (I) carbonate. Each of the resulting cleaning agents was evaluated in the same manner as in Example 1. The results obtained are shown in Table 23.

TABLE 23

| Comparative Example No. | Toxic Component Kind | Concn. (ppm) | LV (cm/sec) | Carrier | Effective Treatment Time (min) |
|---|---|---|---|---|---|
| 11 | arsine | 1000 | 67 | activated carbon | 0 |
| 12 | " | 1000 | 67 | α-alumina | 0 |
| 13 | " | 1000 | 67 | Molecular Sieve 5A | 0 |

EXAMPLE 66 AND 67

Silver (I) carbonate was deposited on Hopcalite of the same kind as used in Example 1 to prepare a cleaning agent having deposited thereon 0.5% or 2.0% of silver (I) carbonate. Each of the resulting cleaning agents was evaluated in the same manner as in Example 1. The results are shown in Table 24.

TABLE 24

| Example No. | Toxic Component Kind | Concn. (ppm) | LV (cm/sec) | Amount of Silver (I) Carbonate (wt. %) | Effective Treatment Time (min) |
|---|---|---|---|---|---|
| 66 | arsine | 1000 | 67 | 2.0 | 25 |
| 67 | " | 1000 | 67 | 0.5 | 12 |

EXAMPLES 68 TO 73

A cleaning agent was prepared in the same manner as in Example 53, except for replacing silver (I) carbonate with silver sulfate, silver chloride, silver bromide, silver iodide, silver phosphate or silver iodate. After the cleaning agents were conditioned to have a water content of about 8%, evaluations were conducted in the same manner as in Example 1. The results obtained are shown in Table 25.

TABLE 25

| Example No. | Compound Deposited | Toxic Component Kind | Concn. (ppm) | LV (cm/sec) | Effective Treatment Time (min) |
|---|---|---|---|---|---|
| 68 | silver sulfate | arsine | 1000 | 67 | 22 |
| 69 | silver chloride | " | 1000 | 67 | 18 |
| 70 | silver bromide | " | 1000 | 67 | 21 |
| 71 | silver iodide | " | 1000 | 67 | 22 |
| 72 | silver phosphate | " | 1000 | 67 | 16 |
| 73 | silver iodate | " | 1000 | 67 | 20 |

EXAMPLES 74 AND 75

A cleaning agent was prepared in the same manner as in Example 62 or 63, except for replacing silver nitrate with silver perchlorate or silver acetate. Each of the resulting cleaning agents was evaluated in the same manner as in Example 1. The results obtained are shown in Table 26.

TABLE 26

| Example No. | Compound Deposited | Toxic Component Kind | Concn. (ppm) | LV (cm/sec) | Effective Treatment Time (min) |
|---|---|---|---|---|---|
| 74 | silver perchlorate | arsine | 1000 | 67 | 10 |
| 75 | silver acetate | " | 1000 | 67 | 12 |

EXAMPLES 76 TO 83

Mn-Cu Molded Composition Containing Cobalt Oxide

The same material as used in Example 18 was used.

Preparation of Cleaning Agent

A suspension of 7.2 g of silver (I) carbonate in 100 ml of water was scattered while being vigorously stirred over the cobalt-containing Mn-Cu molded composition in a tray, and the particles were dried at 80° C. for 2 hours to obtain a cleaning agent having deposited thereon 3.85% of silver (I) carbonate. The cleaning agent was allowed to stand in a room so as to have a water content of about 10%.

Determination of Cleaning Capacity

The cleaning agent was evaluated in the same manner as in Examples 1 to 8. The results obtained are shown in Table 27.

TABLE 27

| Example No. | Toxic Component Kind | Concn. (ppm) | LV (cm/sec) | Effective Treatment Time (min) |
|---|---|---|---|---|
| 76 | arsine | 1000 | 67 | 150 |
| 77 | " | 2000 | 67 | 80 |
| 78 | " | 200 | 67 | 1200 |
| 79 | " | 1000 | 120 | 130 |
| 80 | phosphine | 1000 | 67 | 42 |
| 81 | monosilane | 1000 | 67 | 28 |
| 82 | diborane | 1000 | 67 | 35 |
| 83 | hydrogen selenide | 1000 | 67 | 90 |

EXAMPLE 84

A suspension containing equal weights of silver (I) carbonate and silver (II) oxide was scattered over the Co-containing Mn-Cu molded composition used in Example 18 to obtain a cleaning agent having deposited thereon 3.85% of the silver compounds in total. The resulting cleaning agent was evaluated in the same manner as in Example 1. The result obtained is shown in Table 28.

TABLE 28

| Example No. | Toxic Component Kind | Concn. (ppm) | Amount of AgO + Ag$_2$CO$_3$ (wt. %) | LV (cm/sec) | Effective Treatment Time (min) |
|---|---|---|---|---|---|
| 84 | arsine | 1000 | 3.85 | 67 | 220 |

EXAMPLES 85 AND 86

Preparation of Cleaning Agent

Fourty-eight grams of a solution containing 20 g of silver nitrate dissolved in 100 ml of water was sprayed onto the same cobalt oxide-containing Mn-Cu molded composition as used in Example 18, and the particles were dried at 80° C. for 10 hours to obtain 208 g of a cleaning agent having deposited thereon 3.85% of silver nitrate. The cleaning agent was allowed to stand in air so as to have a water content of about 8%. The thus conditioned cleaning agent was evaluated in the same manner as in Examples 1 and 5. The results obtained are shown in Table 21.

TABLE 29

| Example No. | Toxic Component Kind | Concn. (ppm) | LV (cm/sec) | Effective Treatment Time (min) |
|---|---|---|---|---|
| 85 | arsine | 1000 | 67 | 18 |
| 86 | phosphine | 1000 | 67 | 14 |

EXAMPLES 87 AND 88

Silver (I) carbonate was deposited on the same cobalt oxide-containing Mn-Cu molded composition as used in Example 18 in an amount of 0.5% or 2.0%. Each of the resulting cleaning agents was evaluated in the same manner as in Example 1. The results obtained are shown in Table 30.

TABLE 30

| Example No. | Toxic Component Kind | Concn. (ppm) | LV (cm/sec) | Amount of Silver (I) Carbonate (wt. %) | Effective Treatment Time (min) |
|---|---|---|---|---|---|
| 87 | arsine | 1000 | 67 | 2.0 | 60 |
| 88 | " | 1000 | 67 | 0.5 | 15 |

EXAMPLES 89 TO 94

A cleaning agent was prepared in the same manner as in Example 76, except for replacing silver (I) carbonate with silver sulfate, silver chloride, silver bromide, silver iodide, silver phosphate or silver iodate. After each of the cleaning agents was moistened to have a water content of about 8%, it was evaluated in the same manner as in Example 1.

TABLE 31

| Example No. | Compound Deposited | Toxic Component Kind | Concn. (ppm) | LV (cm/sec) | Effective Treatment Time (min) |
|---|---|---|---|---|---|
| 89 | silver sulfate | arsine | 1000 | 67 | 42 |
| 90 | silver chloride | " | 1000 | 67 | 36 |
| 91 | silver bromide | " | 1000 | 67 | 40 |
| 92 | silver iodide | " | 1000 | 67 | 40 |
| 93 | silver phosphate | " | 1000 | 67 | 22 |
| 94 | silver iodate | " | 1000 | 67 | 38 |

EXAMPLES 95 AND 96

A cleaning agent was prepared in the same manner as in Examples 85 and 86, except for replacing silver nitrate with silver perchlorate or silver acetate. The cleaning agent was dried and conditioned in the same manner as in Examples 85 and 86. The results of evaluations are shown in Table 32.

TABLE 32

| Example No. | Compound Deposited | Toxic Component Kind | Concn. (ppm) | LV (cm/sec) | Effective Treatment Time (min) |
|---|---|---|---|---|---|
| 95 | silver perchlorate | arsine | 1000 | 67 | 16 |
| 96 | silver acetate | " | 1000 | 67 | 18 |

While the invention has been described in detail and with reference to specific embodiments thereof, it will be apparent to one skilled in the art that various changes and modifications can be made therein without departing from the spirit and scope of the present invention.

What is claimed is:

1. A method for cleaning a gas containing at least one toxic component selected from the group consisting of arsine, phosphine, monosilane, diborane, and hydrogen selenide, which comprises contacting the gas with a cleaning agent containing a molded composition comprising (1) manganese dioxide and (2) cupric oxide, having deposited thereon (3) a silver compound, wherein the weight ratio of cupric oxide to manganese dioxide ranges from 0.2 to 1.2 and the amount of the deposited silver compound ranges from 0.01 to 10.5% by weight based on the weight of the cleaning agent.

2. A method as claimed in claim 1, wherein the weight ratio of cupric oxide to manganese dioxide ranges from 0.3 to 0.8.

3. A method as claimed in claim 1, wherein the amount of the deposited silver compound ranges from 0.2 to 5.0% by weight based on the cleaning agent.

4. A method as claimed in claim 1, wherein said silver compound is a silver oxide and/or a substantially water-insoluble silver (I) salt.

5. A method as claimed in claim 1, wherein said silver compound is at least one of silver (I) oxide, silver (II) oxide, and silver (I) carbonate.

6. A method as claimed in claim 1, wherein said cleaning agent has a density of from 0.62 to 1.88 g/ml.

7. A method as claimed in claim 1, wherein said contacting is carried out by passing the gas through a column packed with said cleaning agent.

8. A method as claimed in claim 7, wherein said cleaning agent is packed in the column at a packing density of from 0.4 to 1.2 g/ml.

9. A method as claimed in claim 1, wherein said gas has a temperature of from 0° to 90° C.

10. A method as claimed in claim 1, wherein said gas is air, nitrogen or hydrogen.

11. A method as claimed in claim 1, wherein said cleaning agent is subjected to moisture conditioning so as to have a water content of from about 5 to about 30% by weight before the contacting with the gas.

12. A method as claimed in claim 1, wherein said molded composition further comprises from 5 to 40% by weight of cobalt oxide.

13. A method as claimed in claim 12, wherein the weight ratio of cupric oxide to manganese dioxide ranges from 0.3 to 0.8.

14. A method as claimed in claim 12, wherein the amount of the deposited silver compound ranges from 0.2 to 5.0% by weight based on the cleaning agent.

15. A method as claimed in claim 12, wherein said silver compound is a silver oxide and/or a substantially water-insoluble silver (I) salt.

16. A method as claimed in claim 12, wherein said silver compound is at least one of silver (I) oxide, silver (II) oxide, and silver (I) carbonate.

17. A method as claimed in claim 12, wherein said cleaning agent has a density of from 0.62 to 1.88 g/ml.

18. A method as claimed in claim 12, wherein said contacting is carried out by passing the gas through a column packed with said cleaning agent.

19. A method as claimed in claim 18, wherein said cleaning agent is packed in the column at a packing density of from 0.4 to 1.2 g/ml.

20. A method as claimed in claim 12, wherein said gas has a temperature of from 0° to 90° C.

21. A method as claimed in claim 12, wherein said gas is air, nitrogen or hydrogen.

22. A method as claimed in claim 12, wherein said cleaning agent is subjected to moisture conditioning so as to have a water content of from about 5 to about 30% by weight before the contacting with the gas.

* * * * *